Figures 1, 2, 3:
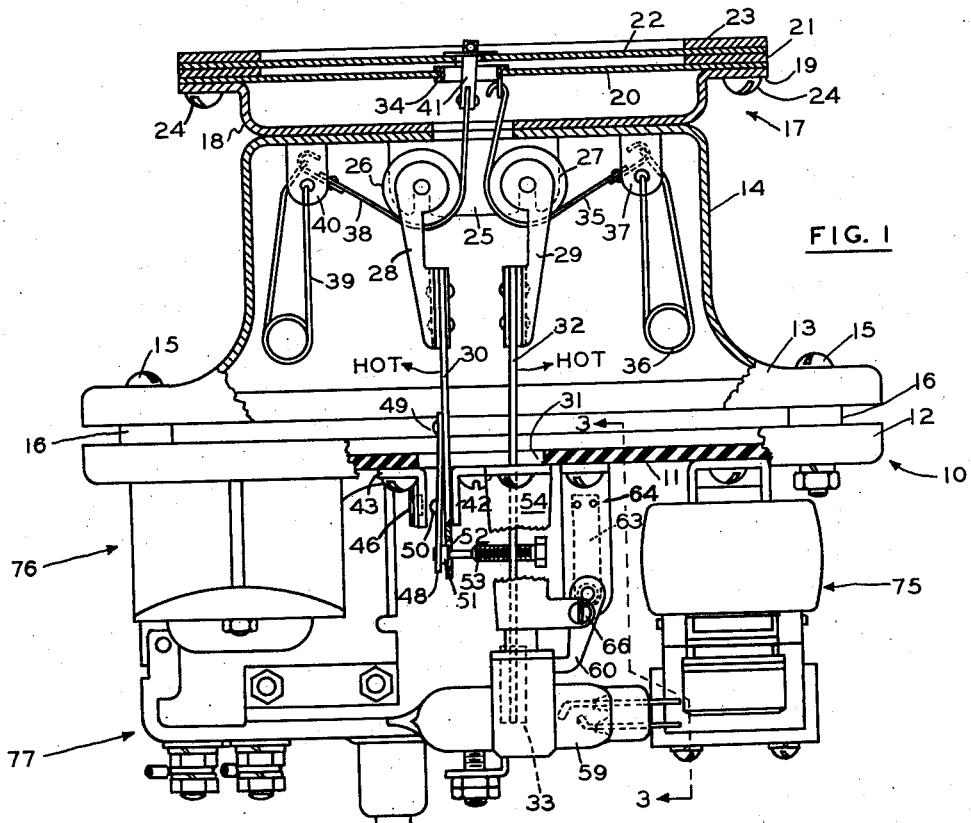

Oct. 11, 1938.  E. M. MILLER  2,132,513
FUEL BURNING SYSTEM AND SWITCHING MECHANISM THEREFOR
Filed May 27, 1933  2 Sheets-Sheet 1

Inventor
ERNEST M. MILLER
By George H. Fisher
Attorney

Oct. 11, 1938.  E. M. MILLER  2,132,513
FUEL BURNING SYSTEM AND SWITCHING MECHANISM THEREFOR
Filed May 27, 1933  2 Sheets-Sheet 2

Inventor
ERNEST M. MILLER
By George H. Fisher
Attorney

Patented Oct. 11, 1938

2,132,513

UNITED STATES PATENT OFFICE 2,132,513

FUEL BURNING SYSTEM AND SWITCHING MECHANISM THEREFOR

Ernest M. Miller, Minneapolis, Minn., assignor to Minneapolis-Honeywell Regulator Company, Minneapolis, Minn., a corporation of Delaware Application May 27, 1933, Serial No. 673,265

7 Claims. (Cl. 158—28)

The present invention relates to improved and simplified systems for burning fuel and particularly relates to those systems for burning fluid fuel such as oil. The present invention also relates to an improved switching mechanism which has particular utility in connection with such fuel burning systems although the switching mechanism, to a certain extent, also has general utility in the field of automatic control and the related arts.

One of the objects of the present invention is the provision of a thermostatic switching mechanism including two thermostatic elements, one of which responds relatively quickly to changes in the temperature of the medium to which it is subjected while the other of the thermostatic elements responds more slowly to changes in the temperature of the medium. In the instant embodiment of the invention, the construction is such that both thermostatic elements are equally sensitive but the arrangement is such that one of the thermostatic elements shields the other thermostatic element in such a manner that the one so shielded responds more slowly to changes in the temperature of the medium to which the two thermostatic elements respond. In the particular embodiment of the invention, to be hereinafter disclosed both of the thermostatic elements are of the diaphragm type, although this is not absolutely necessary. It is to be noted in particular that the thermostatic element which is shielded by the other thermostatic element may be of any desired form or construction but there are particular advantages in utilizing a thermostatic element of the diaphragm type for the purpose of shielding the other thermostatic element.

Another object of the invention is the provision of two thermostatic elements, one of which responds quickly and the other of which responds more slowly to changes in temperature, each of the thermostatic elements operating a switch, one of the switches moving to open position whereas the other of the switches moves to closed position upon temperature change in one direction, with the result that the switches are overlappingly controlled upon temperature change in one direction and are non-overlappingly controlled upon temperature change in the other direction. In other words, upon temperature change in one direction, one of the switches is closed before the other of the switches is opened, whereas upon temperature change in the opposite direction, the first switch opens prior to closing of the second switch. More specifically, an object of the invention is the provision of a thermostatic element which responds to temperature changes relatively quickly and moves a switch to closed position upon rise in temperature in combination with a second thermostatic element which responds to changes in temperature more slowly than the first mentioned thermostatic element and controls a switch to move it to open position upon rise in temperature. As a result, the first mentioned switch is closed prior to opening of the last named switch upon rise in temperature but is opened prior to closing of the last named switch upon fall in temperature. In the specific construction herein disclosed, the two thermostatic elements are connected to their respective switches by means of slip friction connecting means in order that the switches are operated upon temperature reversals rather than at any particular predetermined temperatures.

A further object of the invention is the provision of switching mechanism which is controlled by the conjoint action of two thermostatic elements, one of which responds relatively quickly to changes in temperature whereas the other thermostatic element responds more slowly to changes in temperature.

Another object of the invention is the provision of temperature operated switching mechanism comprising a thermostatically operated switch in which the thermostatic element is shielded from the temperature to which it responds. Such an arrangement has particular utility where the thermostatic element responds to the temperature of the products of combustion of a fuel burning system and where the shielding member seals the thermostatic element from direct contact with the products of combustion.

A further object of the invention is the provision of a switching mechanism including first circuit controlling means adapted to be moved to open and closed position by an actuator in combination with a second circuit controlling means which is operated by the movement of the first circuit controlling means in moving from its open to closed positions and vice versa.

A more specific object of the invention is the provision of a mercury switch which is pivoted below its center of gravity and is operated to open and closed circuit positions by any suitable actuator in combination with a second switch, of any desired type, which is controlled by the movement of the pivoted mercury switch.

Another object of the invention is the provision of a simplified automatic control system for fuel burning apparatus which system utilizes a single electromagnetic coil in combination with a combustion responsive switching mechanism having hot and cold switches, the system being so arranged as to have all of the usual safety features, including a delayed recycle upon cessation of combustion as a result of flame failure or momentary power failure.

Another object of the invention is the provision of a fuel burning system including a switch which must be closed in order to place the system into operation, this switch being controlled by combustion conditions, the arrangement being such that the ignition switch must be closed in order to obtain closure of said first mentioned switch, with the result that the ignition means is positively conditioned for operation before the system can be placed into operation.

Another object of the invention is the provision of an automatically controlled fuel burning system which can only be placed into operation when a combustion responsive switch is in closed circuit position and controlling the combustion responsive switch by the conjoint action of two thermostatic elements, one of which responds relatively quickly to changes in the temperature of combustion whereas the other of the thermostatic elements responds more slowly to changes in the temperature of combustion.

Further objects of the invention will become apparent as the description of the invention proceeds.

Figure 4:
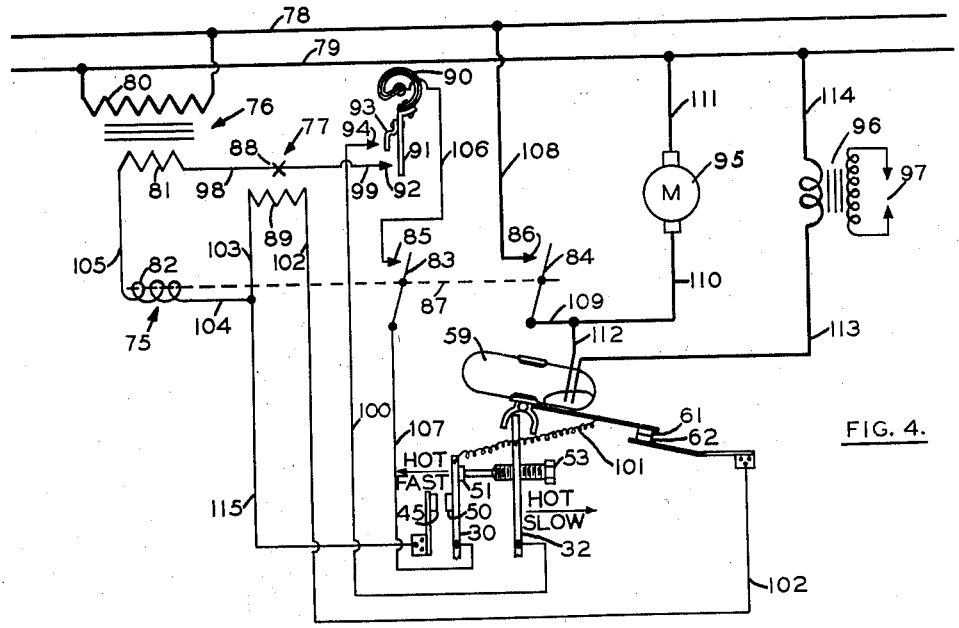
Figure 5:
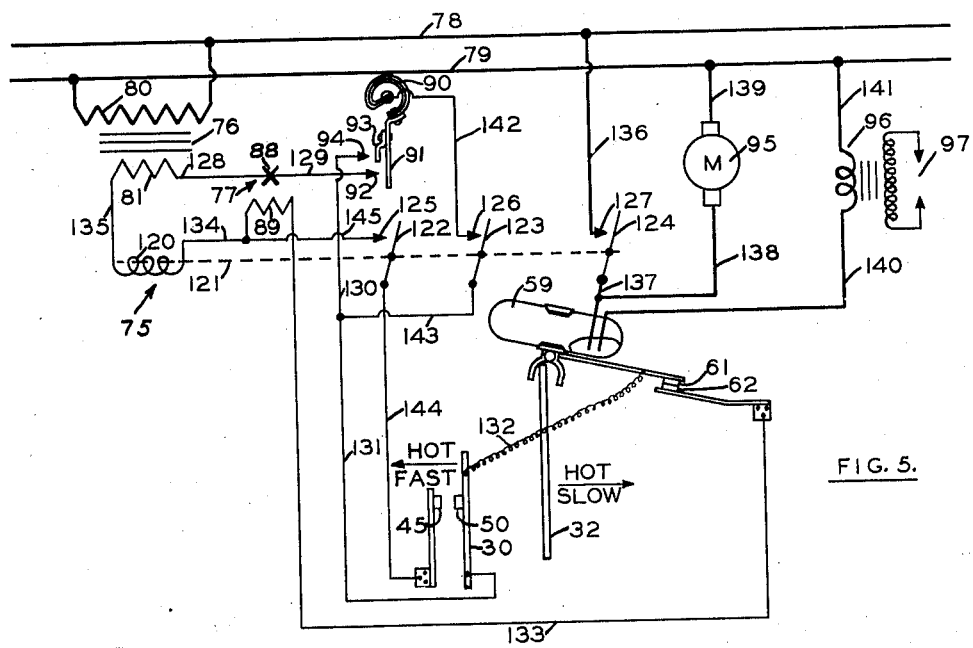

For a more complete understanding of the invention reference may be had to the following descriptions and accompanying drawings, in which, Fig. 1 is a top view of the switching mechanism comprising one of the features of the present invention, some parts being broken away and other parts being in section to more thoroughly show the construction thereof, Fig. 2 is a front view of the switching mechanism shown in Fig. 1, Fig. 3 is a sectional view taken about on line 3—3 of Fig. 1, Fig. 4 is a diagrammatic illustration of an automatic fuel burning control system utilizing the switching mechanism of Figs. 1, 2 and 3 and, Fig. 5 is a diagrammatic showing of a modified fuel burning control system.

Referring first to Figs. 1, 2 and 3, the switching mechanism and some of the other usual devices utilized in the control of a fuel burning system are shown as mounted upon or supported by a base generally indicated at 10. This base 10 comprises a panel 11 of electrical insulating material and a steel frame member 12.

A housing 13 which is provided with an integral tubular projection 14 is secured to base 10 by suitable screws 15 and is spaced therefrom by suitable spacing sleeves 16.

A diaphragm assembly, generally indicated at 17, comprises a circular member having a depressed portion 18 adapted to be secured to the outer side of projection 14 and a circular flange 19 upon which is placed a first diaphragm 20. A spacing ring 21 is next placed upon diaphragm 20, followed by a second diaphragm 22, upon which is placed a clamping ring 23. The flange 19, diaphragm 20, spacing ring 21, diaphragm 22 and clamping ring 23 are all securely fastened together by suitable means such as the screws 24.

A bracket 25, mounted within the projection 14, rotatably supports a pair of rollers 26 and 27 to each of which is secured an arm, such as the arms 28 and 29. Arm 28 carries an actuating arm 30 which projects through an opening 31 formed in the insulating panel 11 and terminates in front of this panel. A similar actuating arm 32 is carried by arm 29 and extends through the opening 31 in panel 11. Actuating arm 32 extends beyond the end of actuating arm 30 and its outermost end is reduced in width and carries a cylindrical bushing of electrical insulating material indicated at 33.

The diaphragm 20 is provided with an opening in its central portion and the circular edge thus formed in the diaphragm is reenforced by a collar 34 to which is attached one end of ribbon 35 that passes over roller 27 and has its other end secured to one end of a spring 36. The other end of spring 36 is fastened to a bracket 37 carried by tubular projection 14. In a similar manner, a ribbon 38 has one of its ends secured to one end of a spring 39, the other end of spring 39 being secured to a bracket 40 carried by tubular extension 14. The ribbon 38 passes over roller 26 and has its other end secured to a pin 41 which extends through the opening in diaphragm 20 and is suitably connected to the diaphragm 22.

Counter-clockwise movement of actuating arm 30 is limited by a stop 42 which takes the form of a bracket secured to panel 11. Clockwise movement of actuating arm 30 is similarly limited by a bracket 43 secured to panel 11. The bracket 43 is provided with an opening 44 into which projects a contact 45 carried by one end of a light spring finger 46, the other end of which is secured to bracket 43 as by the rivet shown at 47. A similar light spring finger 48 has one of its ends secured to actuating arm 30 as indicated at 49. Intermediate between the ends of spring finger 48 there is a contact 50 which, upon clockwise rotation of actuating arm 30, enters the opening 44 in bracket 43 and engages the contact 45 carried by spring finger 46. The outer free end of spring finger 48 carries a contact 51 which is adapted to enter an opening 52 formed in actuating arm 30 and cooperates with a contact screw 53 carried by actuating arm 32.

A bracket 54, which is secured to panel 11 by means of a screw 55, supports a stud-shaft 56 upon which is pivotally mounted a carrier 57 which supports a mercury switch clip 58. A mercury switch 59 is carried by the mercury switch clip 58. The carrier 57 is provided with a contact carrying extension 60 which carries a contact 61 that is adapted to engage a contact 62 carried by a spring finger 63. The spring finger 63 is secured to a bracket 64 which in turn is fastened to panel 11 and this bracket 64 is provided with an opening 65 into which contact 62 projects. Engagement of extension 60 with bracket 64 determines the limit of clockwise movement of mercury switch 59 as viewed in Fig. 2. Counterclockwise movement of mercury switch 59 is limited by a screw 66 which projects through bracket 54 and is adapted to be engaged by extension 60.

The carrier 57 is additionally provided with a yoke 67 one arm of which is provided with a screw 68 for the purpose of adjusting the effective distance between the two arms of yoke 67. A link 69, which is pivoted to stud-shaft 56, extends through an opening in carrier 57 and terminates in a fork having arms 70 and 71 which straddle the bushing 33 of insulating material carried by the outer end of actuating arm 32.

The diaphragm 22 is adapted to be directly exposed to the temperature of the medium to which it is to respond and when the switching mechanism of Figs. 1, 2 and 3 is used in conjunction with a control system for a fuel burning apparatus the diaphragm 22 is directly exposed to the flame produced by the burning of the fuel. The switching mechanism is shown in its cold position in Figs. 1, 2 and 3 and if a fire is now established, or the temperature to which diaphragms 20 and 22 are subjected be otherwise increased, the diaphragm 22 will become heated to a higher degree and will attempt to expand. Circumferential expansion is prevented and, as a result, the center portion of diaphragm 22 bulges. This bulging action will be in a downward direction as viewed in Fig. 1 by reason of the tension supplied by spring 39 and transmitted to diaphragm 22 by ribbon 38. Downward movement of the center portion of diaphragm 22 rotates roller 26 and actuating arm 30 in a clockwise direction, as viewed in Fig. 1, with the result that contact 51 is moved out of engagement with contact screw 53 and, if the temperature continues to increase, contact 50 is moved into engagement with contact 45. When the temperature has increased sufficiently, spring finger 48 abuts bracket 43 and further clockwise rotation of actuating arm 30 is prevented. However, further downward movement of central portion of diaphragm 22 is permitted since the ribbon 38 will slip over roller 26. This increase in temperature will be transmitted to diaphragm 20 more slowly since diaphragm 20 is shielded from direct exposure to the flame by diaphragm 22. After a time interval the increase in temperature will be transmitted to diaphragm 20 whereupon its center portion will move downwardly as viewed in Fig. 1, causing roller 27 and actuating arm 32 to rotate in a counterclockwise direction. Contact screw 53 thereby moves further away from contact 51 and bushing 33 moves away from arm 71 and engages arm 70 of link 69. Continued downward movement of diaphragm 20 results in movement of arm 70 of link 69 into engagement with screw 68, whereupon mercury switch carrier 57 is tilted in a counterclockwise direction as viewed in Fig. 2. This movement of mercury switch carrier 57 disengages contact 61 from contact 62 and, when the mercury contained in mercury switch 59 rolls to the left hand end of mercury switch 59 to break the circuit between the electrodes thereof, the mercury switch 59 will become unbalanced and continue tilting in a counterclockwise direction due to its own weight which is now exerted in a downward direction at a point to the left of the axis of stud-shaft 56, as viewed in Fig. 3. Extension 60 will thus be brought into engagement with the end of screw 66 and limit further counter-clockwise movement of mercury switch 59 and its carrier 57. The various switches are now in their hot positions and any continued movement of either of the diaphragms 20 or 22 merely results in slipping of their respective ribbons 35 and 38 over their respective rollers 27 and 26.

When the temperature to which diaphragms 22 and 20 are exposed lowers, diaphragm 22, being directly exposed to the medium of changing temperature, will respond first and its center portion will begin to move upwardly as viewed in Fig. 1. Roller 26 and actuating arm 30 therefore begin rotating counter-clockwise. Initial counter-clockwise movement of actuating arm 30 separates contact 50 from contact 45 after which actuating arm 30 engages the stop bracket 42 thereby limiting further counter-clockwise rotation of actuating arm 30. Continued upward movement of the center portion of diaphragm 22 thereafter results in slipping between ribbon 38 and roller 26. After a time interval, the lowering in temperature will be responded to by diaphragm 20 and its center portion will begin moving upwardly, as viewed in Fig. 1, resulting in clockwise rotation of roller 27 and actuating arm 32. Initial clockwise rotation of actuating arm 32 causes bushing 33 to disengage arm 70 of link 69, pick-up arm 71 and bring arm 71 into engagement with yoke 67 to rotate mercury switch 59 in a clockwise direction as viewed in Fig. 2. When mercury switch 59 has been rotated sufficiently far to cause the mercury therein to move to the right hand end thereof and bridge its electrodes to complete the circuit therethrough, the weight of the mercury moving from its position to the left of the axis of stud-shaft 56 to a position to the right of the axis of stud-shaft 56 will cause a further quick clockwise rotation of mercury switch 59 and carrier 57 with the result that contact 61 is brought into engagement with contact 62. Continued clockwise rotation of actuating arm 32 brings bushing 33 into engagement with arm 71 of link 69 and contact screw 53 into engagement with contact 51. Further clockwise rotation of actuating arm 32 is prevented by the engagement of extension 60 with bracket 64 and any further upward movement of the center portion of diaphragm 20 will again result in slipping between ribbon 35 and roller 27. The parts are now in their cold position which is the position shown in the drawings.

From the foregoing description of the operation of the switching mechanism shown in Figs. 1, 2, and 3, it will be noted that the switch comprised by contact screw 53 and contact 51 is controlled by the conjoint action of two thermostatic elements, one of which responds quickly to temperature changes, whereas the other responds more slowly to temperature changes. It will also be noted, that on temperature rise, contact 50 is quickly moved into engagement with contact 45 and after an interval, contact 61 is moved out of engagement with contact 62 with the result that these contacts are overlappingly controlled on temperature rise. In other words, the two pairs of contacts, or two switches, are both closed during a short period, although originally one of the switches was open and the other was closed. On temperature fall, contact 50 quickly disengages contact 45 and, after an interval, contact 61 engages contact 62. On temperature fall, therefore, the two switches comprising contacts 50—45 and 61—62 are non-overlappingly controlled. That is, the two switches are not both closed at the same time for even a very short period. In the claims, the expression "overlappingly controlled" is used to define this operation wherein the two switches are both closed for a short time and the term "non-overlappingly controlled" is used to define the operation wherein the two switches are not both closed at the same time, even for a very short period.

This switching mechanism is also arranged in such a manner that the closing of contacts 61 and 62 is dependent upon actual movement of mercury switch 59 so as to insure that the circuit through mercury switch 59 is closed every time the circuit through contacts 61 and 62 is closed. This gives a positive check on the operation of mercury switch 59 since the operation of contacts 61 and 62 is controlled by the actual movement of mercury switch 59 and not the movement of the actuator which in turn actuates mercury switch 59.

When the switching mechanism of the present invention is used to control a fuel burning system such as an automatically controlled oil burner, the panel 11 may support a relay of usual form, indicated at 75, a step-down transformer, generally indicated at 76, and a thermostatically operated safety switch, generally indicated at 77, all of which parts are now well known in the art of automatic controls.

Fig. 4 discloses a simple oil burner circuit, having all of the usual safety features and utilizing the switching mechanism shown in Figs. 1, 2 and 3. While the system has particular utility in connection with the switching mechanism shown in Figs. 1, 2 and 3, it is to be understood that this system also has utility in connection with the other switching mechanisms which provide the same sequence of operation.

Power is supplied to the system of Fig. 4 by means of line wires 78 and 79 to which the stepdown transformer 76 is connected. This stepdown transformer includes a high voltage primary 80 and a low voltage secondary 81. The relay 75 comprises a single simple electromagnetic coil 82 which, when energized, moves switch arms 83 and 84 into engagement with relatively stationary contacts 85 and 86 by means of an armature 87. A thermal safety switch 77 includes the usual thermostatically operated switch 88, the action of which is controlled by electrical heating element 89, the switch 88 normally being closed and being operated to open position upon a predetermined heating by the heating element 89, after which the switch 88 remains open until manually reclosed. Such safety switches are well known in the art and this safety switch may well take the form shown in Denison application Ser. No. 226,395 filed October 15th, 1927.

The system of Fig. 4 is herein shown as controlled by a room thermostat having a bimetallic actuator 90 which upon cooling, first moves a flexible blade 91 into engagement with a contact 92 and, upon further cooling, moves a flexible blade 93 into engagement with a contact 94. Upon heating, the blade 93 first disengages contact 94 and upon continued heating, the blade 91 disengages contact 92.

The system of Fig. 4 also includes an electrically operable fuel supply controlling device herein shown as a burner motor 95 and an electrically operable ignition means herein shown as a stepup transformer 96, the high voltage secondary of which is connected to spark electrodes, indicated at 97.

The parts as shown in Fig. 4 are in their nonoperating position in which the room temperature is at or above the desired point and no heat is being supplied. As the room gradually cools, blade 91 will first engage contact 92 and thereafter blade 93 will engage contact 94 to establish an initial energizing circuit for electromagnetic coil 82 as follows: low voltage stationary 81, wire 98, safety switch 88, wire 99, contact 92, blades 91 and 93, contact 94, wire 100, contacts 53 and 51, wire 101, contacts 61 and 62, wire 102, electrical heating element 89, wire 103, wire 104, electromagnetic coil 82, and wire 105 to the other side of secondary 81. Energization of electromagnetic coil 82 attracts armature 87 and moves switch arms 83 and 84 into engagement with their respective contacts 85 and 86. Engagement of switch arm 83 with contact 85 establishes a holding circuit for electromagnetic coil 82 which is independent of blade 93 and contact 94 and is also independent of contacts 53 and 51. This holding circuit is as follows: low voltage secondary 81, wire 98, safety switch 88, wire 99, contact 92, blade 91, wire 106, contact 85, switch arm 83, wire 107, actuating ram 30, wire 101, contacts 61 and 62, wire 102, heating element 89, wire 103, wire 104, electromagnetic coil 82, and wire 105 to the other side of secondary 81. Engagement of switch arm 84 with contact 86 establishes energizing circuits for motor 95 and ignition means 96. The motor circuit is as follows: line 78, wire 108, contact 86, switch arm 84, wire 109, wire 110, motor 95, and wire 111 to line 79. The ignition circuit is as follows: line 78, wire 108, contact 86, switch arm 84, wire 109, wire 112, ignition switch 59, wire 113, ignition means 96 and wire 114 to line 79.

Energization of motor 95 delivers fuel to the burner which fuel should be ignited by reason of the spark created across the electrodes 97 as the result of energization of ignition means 96. If combustion is not properly established, safety switch 88 will be moved to open circuit position by the continued heating of electrical element 89 and the system will be rendered inoperative until manual intervention.

Assuming that combustion is properly established, actuator 30 will be quickly moved to disengage contact 51 from contact 53. This action interrupts the initial energizing circuit for electromagnetic coil 82 but does not disturb the holding circuit therefor. In a short time, actuator 30 will move contact 50 into engagement with contact 45. Engagement of contacts 45 and 50 establishes a maintaining circuit for electromagnetic coil 82 which shunts the electrical heating element 89. This maintaining circuit is as follows: Secondary 81, wire 98, safety switch 88, wire 99, contact 92, blade 91, wire 106, contact 85, switch arm 83, wire 107, contacts 50 and 45, wire 115, wire 104, electromagnetic coil 82, and wire 105 to the other side of secondary 81. After a time delay, actuator 32 will respond to the increased temperature due to the establishment of combustion and will separate contact 61 from contact 62 and move mercury switch 59 to its open circuit position as previously described in connection with Figs. 1, 2 and 3. Separation of contacts 61 and 62 interrupts the previously described holding circuit which traverses electrical heating element 89 and electromagnetic coil 82. Movement of mercury switch 59 to open circuit position de-energizes ignition means 96. The system is now operating in a normal manner and under normal conditions will continue to so operate until blade 91 is moved from engagement with contact 92 as a result of the temperature of the room having been restored to the desired value. When this occurs, it will be noted that the system cannot again be put into operation until contact 61 engages contact 62 and until contact screw 53 engages contact 51, since the initial energizing circuit for electromagnetic coil 82 must traverse both of these pairs of contacts in series.

If there should be a momentary or instantaneous power failure, during operation of the system, of such short duration that the power is returned before the temperature of combustion has lowered sufficiently to open contacts 45 and 50, electromagnetic coil 82 will be de-energized and cannot again be re-energized until the pairs of contacts 61—62 and 53—51 have reclosed. These pairs of contacts will not reclose until after a time delay as previously explained in connection with Figs. 1, 2 and 3. In this manner, the burner motor 95 cannot be re-energized after a momentary or instantaneous power failure until a time delay has been interposed in order to allow the combustion chamber to cool and to allow any oil vapors collected therein to be dissipated by the natural draft. After this time delay, the system recycles enirely and goes through its complete cycle of starting operations so that everything must be functioning properly in order to again put the system into operation.

The operation of the system is similar if the flame should go out during normal operation. In this case, the motor 95 will continue operating for a very short period until the temperature of combustion lowers sufficiently to move contact 50 from engagement with contact 45. Disengagement of contacts 50 and 45 interrupts the maintaining circuit for electromagnetic coil 82 and allows switch arms 83 and 84 to disengage their contacts 85 and 86 respectively. Under these conditions the system will again remain shut down until the temperature of combustion lowers sufficiently to reclose the pairs of contacts 61—62 and 51—53.

From the foregoing description of the operation of the system of Fig. 4, it will be seen that this system, while very simple in that it uses only a single electromagnetic coil, it nevertheless provides for all of the usual safety features including shut-down of the system whenever there is a failure to establish combustion and a recycling of the system, after a delayed interval, upon a flame failure or a momentary power failure. In addition, the system of Fig. 4 checks each and every one of its operations in that it can only be placed into operation by the completion of a circuit controlled by combustion conditions and can only be maintained in operation by the completion of another circuit also controlled by combustion conditions.

Fig. 5 shows a modified system in which contacts 51 and 53 have been omitted. The system of Fig. 5 is functionally equivalent to the function of Fig. 4, although the wiring of the control circuits has been necessarily re-arranged in view of the omission of contacts 51 and 53. Those parts of Fig. 5 which correspond with Fig. 4 have been numbered to agree with the numbering of the parts in Fig. 4.

The relay 75 in Fig. 5 comprises an electromagnetic coil 120, which, by means of an armature 121, moves switch arms 122, 123 and 124 respectively into engagement with contacts 125, 126 and 127 when the electromagnetic coil is energized.

Upon a call for heat resulting in engagement of blade 91 with contact 92 and then blade 93 with contact 94, an initial energizing circuit for electromagnetic coil 120 is established as follows: secondary 81, wire 128, safety switch 88, wire 129, contact 92, blade 91, blade 93, contact 94, wire 130, wire 131, actuating arm 30, wire 132, contacts 61 and 62, wire 133, electrical heating element 89, wire 134, electromagnetic coil 120, and wire 135 to the other side of secondary 81. Energization of electromagnetic coil 120 moves switch arms 122, 123 and 124 into engagement with contacts 125, 126 and 127 respectively. Engagement of switch arm 124 with contact 127 establishes energizing circuits for motor 95 and ignition means 96 in the manner described in connection with Fig. 4. The energizing circuit for motor 95 is as follows: line 78, wire 136, contact 127, switch arm 124, wire 137, wire 138, motor 95 and wire 139 to line 79.

The energizing circuit for ignition means 96 is as follows: line 78, wire 136, contact 127, switch arm 124, wire 137, ignition switch 59, wire 140, ignition means 96, and wire 141 to line 79. Engagement of switch arm 123 with contact 126 establishes a holding circuit for electromagnetic coil 120 which holding circuit is independent of blade 93 and contact 94. This holding circuit is as follows: Secondary 81, wire 128, safety switch 88, wire 129, contact 92, blade 91, wire 142, contact 126, switch arm 123, wire 143, wire 131, actuating arm 30, wire 132, contacts 61 and 62, wire 133, heating element 89, wire 134, electromagnetic coil 120 and wire 135 to the other side of secondary 81.

The motor 95 is now supplying fuel to the burner and the ignition means 96 operates to ignite the fuel thus supplied to the burner. If combustion is not successfully established, continued heating of heating element 89 will cause safety switch 88 to open and render the system inoperative until manual intervention.

Assuming that combustion is successfully established, contacts 45 and 50, controlled by the thermostatic element 22 which quickly responds to changes in the temperature of combustion, are closed. Closure of contacts 45 and 50 establishes a maintaining circuit through electromagnetic coil 120 as follows: secondary 81, wire 128, safety switch 88, wire 129, contact 92, blade 91, wire 142, contact 126, switch arm 123, wire 143, wire 131, actuating arm 30, contacts 50 and 45, wire 144, switch arm 122, contact 125, wire 145, wire 134, electromagnetic coil 120 and wire 135 to the other side of secondary 81. It will be noted that this maintaining circuit includes switch arm 122 and contact 125 and that it shunts electrical heating element 89. After a delayed interval, thermostatic element 20 will respond to the increased temperature due to the establishment of combustion and will open contacts 61 and 62 and move ignition switch 59 to open circuit position. Opening of contacts 61 and 62 interrupts the initial energizing circuit and the holding circuit for electromagnetic coil 120 but does not disturb the maintaining circuit therefor. Opening of ignition switch 59 de-energizes the ignition means 96.

If there should be a temporary or momentary failure of electrical power while the system of Fig. 5 is in operation, electromagnetic coil 120 will be de-energized thereby allowing switch arm 122 to move from engagement with contact 125. A time delay will therefore be interposed until contacts 61 and 62 reclose. On the other hand, if the flame should become extinguished for any reason during normal operation of the burner, the maintaining circuit will be interrupted immediately upon separation of contacts 45 and 50 and electromagnetic coil 120 will be de-energized. Under these conditions, re-energization of electromagnetic coil 120 is again prevented until the expiration of a time interval measured by the closing of contacts 61 and 62. When contacts 61 and 62 finally re-engage, the system will recycle in the normal manner in an attempt to reestablish combustion.

From the foregoing description of the operation of the system of Fig. 5, it will be seen that contacts 51 and 53 of the system of Fig. 4 may be eliminated by the inclusion of another switch operated by relay coil 120 without sacrificing any of the safety features of the system of Fig. 4 or without changing the basic functioning and operation of the system of Fig. 4.

While specific embodiments of the invention have been herein disclosed, it will be apparent that many changes could be made without departing from the invention herein disclosed and I intend to be limited only in the purview of the appended claims.

I claim as my invention:

1. In combination; an electrically operable fuel supply controlling device; a switch in circuit therewith; an electromagnet for closing said switch when energized; ignition means; a combustion responsive element which responds quickly to changes in combustion conditions; a combustion responsive element which responds more slowly to changes in combustion conditions; a first cold switch controlled by the combined action of said elements, said switch being closed in the absence of combustion and open in the presence of combustion; a main switch; connections by which said main switch and first cold switch conjointly control initial energization of said electromagnet; holding switch means moved to closed position by said electromagnet when energized; a second cold switch controlled only by said element which responds more slowly to changes in combustion conditions, said cold switch opening upon establishment of combustion after said first cold switch opens; a maintaining circuit for said electromagnet controlled by said main switch, holding switch means and second cold switch in series, a hot switch controlled by said element which responds quickly to changes in combustion conditions, said hot switch closing upon establishment of combustion prior to opening of said second cold switch; and a maintaining circuit for said electromagnet controlled by said main switch, hot switch and holding switch means in series.

2. In combination; a first actuator responsive relatively quickly to changes in combustion conditions; a first controlled element; connections between said actuator and first controlled element including non-positive connecting means whereby said element is operated upon initial changes in combustion conditions; a second actuator responsive more slowly to changes in combustion conditions; a second controlled element; connections between said second actuator and second element including non-positive connecting means whereby said second element is operated upon initial changes in combustion conditions; a first cold switch closed upon cessation of combustion and controlled by the combined movements of said first and second elements whereby the same is quickly opened upon establishment of combustion and is slowly closed upon cessation of combustion; a second cold switch closed upon cessation of combustion; a lost-motion connection between said second cold switch and said second element whereby said second cold switch opens after said first cold switch opens upon establishment of combustion and closes prior to said first cold switch upon cessation of combustion; a hot switch closed upon establishment of combustion and directly controlled by said first element only whereby said hot switch closes after opening of said first cold switch but prior to opening of said second cold switch and opens upon cessation of combustion prior to closing of either of said cold switches; an electromagnetic coil; holding switch means closed thereby when energized; a main switch; an initial energizing circuit for said electromagnetic coil controlled by said main switch and first cold switch in series; a holding circuit for said electromagnetic coil controlled by said main switch, holding switch means and second cold switch in series; a maintaining circuit for said electromagnetic coil controlled by said main switch, holding switch means and hot switch in series; and fuel supply controlling means rendered operative to supply fuel upon energization of said electromagnetic coil.

3. In combination; a first actuator responsive relatively quickly to changes in combustion conditions; a first controlled element; connections between said actuator and first controlled element including non-positive connecting means whereby said element is operated upon initial changes in combustion conditions; a second actuator responsive more slowly to changes in combustion conditions; a second controlled element; connections between said second actuator and second element including non-positive connecting means whereby said second element is operated upon initial changes in combustion conditions; a first cold switch closed upon cessation of combustion and controlled by the combined movements of said first and second elements whereby the same is quickly opened upon establishment of combustion and slowly closed upon cessation of combustion; a second cold switch closed upon cessation of combustion and controlled by movement of the second element only through a lost-motion connection whereby said second cold switch opens after said first cold switch opens upon establishment of combustion and closes prior to said first cold switch upon cessation of combustion; a hot switch closed upon establishment of combustion and directly controlled by said first element only whereby said hot switch closes after opening of said first cold switch but prior to opening of said second cold switch and opens upon cessation of combustion prior to closing of either of said cold switches; an electromagnetic coil; holding switch means closed thereby when energized; a main switch; a thermal safety switch and electrical heating element therefor; an initial energizing circuit for said electromagnetic coil and heating element controlled by said main switch, safety switch and first cold switch in series; a holding circuit for said electromagnetic coil and heating element controlled by said main switch, safety switch, holding switch means and second cold switch in series; a maintaining circuit for said electromagnetic coil independent of said heating element controlled by said main switch, holding switch means and hot switch in series; and fuel supply controlling means rendered operative to supply fuel upon energization of said electromagnetic coil.

4. In combination; a first actuator responsive relatively quickly to changes in combustion conditions; a first controlled element; connections between said actuator and first controlled element including non-positive connecting means whereby said element is operated upon initial changes in combustion conditions; a second actuator responsive more slowly to changes in combustion conditions; a second controlled element; connections between said second actuator and second element including non-positive connecting means whereby said second element is operated upon initial changes in combustion conditions; a first cold switch closed upon cessation of combustion and controlled by the combined movements of said first and second elements whereby the same is quickly opened upon establishment of combustion and slowly closed upon cessation of combustion; a second cold switch closed upon cessation of combustion; connections between said second cold switch and second element only by which said second cold switch is opened after said first cold switch opens upon establishment of combustion and by which said second cold switch is closed prior to said first cold switch upon cessation of combustion; a hot switch closed upon establishment of combustion and directly controlled by said first element only whereby said hot switch closes after opening of said first cold switch but prior to opening of said second cold switch and opens upon cessation of combustion prior to closing of either of said cold switches; an electromagnetic coil; a single holding switch closed thereby when energized; first and second main switches sequentially closed in the order named; an initial energizing circuit for said electromagnetic coil controlled by said second main switch and first cold switch in series; a holding circuit for said electromagnetic coil controlled by said first main switch, holding switch and second cold switch in series; a maintaining circuit for said electromagnetic coil controlled by said first main switch, holding switch and hot switch in series; and fuel supply controlling means rendered operative to supply fuel upon energization of said electromagnetic coil.

5. In combination; a first actuator responsive relatively quickly to changes in combustion conditions; a first controlled element; connections between said actuator and first controlled element including non-positive connecting means whereby said element is operated upon initial changes in combustion conditions; a second actuator responsive more slowly to changes in combustion conditions; a second controlled element; connections between said second actuator and second element including non-positive connecting means whereby said second element is operated upon initial changes in combustion conditions; a first cold switch closed upon cessation of combustion and controlled by the combined movements of said first and second elements whereby the same is quickly opened upon establishment of combustion and slowly closed upon cessation of combustion; a second cold switch closed upon cessation of combustion; connections between said second cold switch and second element by which said second cold switch is opened after said first cold switch opens upon establishment of combustion and is closed prior to closing of the first cold switch upon cessation of combustion; a hot switch closed upon establishment of combustion and directly controlled by said first element only whereby said hot switch closes after opening of said first cold switch but prior to opening of said second cold switch and opens upon cessation of combustion prior to closing of either of said cold switches; a thermal safety switch and heating element therefor; an electromagnetic coil; a holding switch closed thereby when energized; first and second condition responsive main switches closed in the order named upon decrease in said condtion; an initial energizing circuit for said electromagnetic coil and heating element controlled by said second main switch, safety switch and first cold switch in series; a holding circuit for said electromagnetic coil and heating element controlled by said first main switch, holding switch, safety switch and second cold switch in series; a maintaining circuit for said electromagnetic coil only controlled by said first main switch, holding switch and hot switch in series, and fuel supply controlling means rendered operative to supply fuel upon energization of said electromagnetic coil.

6. In combination; an electromagnetically operated fuel supply controlling device; an electromagnetic coil; first, second and third switches moved to closed position thereby when the same is energized; a circuit for said fuel supply controlling device controlled by said first switch; ignition means; an ignition switch responsive to combustion conditions which is closed in the absence of combustion and open in the presence of combustion; a circuit for said ignition means controlled by said first switch and said ignition switch in series; a combustion responsive device; a cold switch and a hot switch; connections between said switches and said combustion responsive device by which said hot switch is closed prior to opening of said cold switch upon the establishment of combustion and said hot switch is opened prior to closing of said cold switch upon the cessation of combustion; a thermal safety switch arranged to render the system inoperative when opened; an electric heating element therefor; a main control device responsive to a condition to be controlled which sequentially closes first and second switches in the order named upon a change in such condition in a direction demanding operation of the system; an initial energizing circuit for said electromagnetic coil including both switches of said main control, said cold switch and said electric heating element all in series; a holding circuit for said electromagnetic coil including the first of said main control switches, the second switch operated by the electromagnetic coil, said cold switch, and said electric heating element all in series; and a maintaining circuit for said electromagnetic coil including the first to close of said main switches, the second and third switches operated by the electromagnetic coil and said hot switch all in series.

7. In combination; an electrically operated fuel supply controlling device; a single electromagnetic coil; first and second switches moved to closed position thereby when the same is energized; a circuit for the fuel supply means controlled by said first switch; ignition means; a combustion controlled ignition switch that is closed during the absence of combustion and which opens upon the establishment of combustion; a circuit for said ignition means controlled by said ignition switch and said first switch in series; first and second cold switches; a hot switch; means responsive to combustion conditions for substantially immediately opening said first cold switch, then closing said hot switch and thereafter opening said second cold switch upon the establishment of combustion and for substantially immediately opening said hot switch, then closing said second cold switch and thereafter closing said first cold switch on cessation of combustion; a thermal safety switch arranged to render the system inoperative when opened; an electric heating element for said safety switch; a main control including first and second switches that sequentially close in the order named upon a change in a condition being controlled in such a direction as to demand operation of the system; an initial energizing circuit for said electromagnetic coil including both switches of said main control, both of said cold switches and said heating element all in series; a holding circuit for said electromagnetic coil including the first to close of said main switches, the electromagnetic coil, said second electromagnetic coil operated switch, said second cold switch, and said heating element all in series; and a maintaining circuit for the electromagnetic coil including the first to close of said main switches, the electromagnetic coil, the second switch controlled by the electromagnetic coil, and the hot switch all in series.

ERNEST M. MILLER.